US010275936B2

(12) United States Patent
Akuzawa et al.

(10) Patent No.: US 10,275,936 B2
(45) Date of Patent: Apr. 30, 2019

(54) NON TRANSITORY COMPUTER-READABLE STORAGE MEDIUM AND METHOD OF CONTROLLING A COMPUTER

(71) Applicant: CAPCOM CO., LTD., Osaka (JP)

(72) Inventors: Haruna Akuzawa, Osaka (JP); Teppei Yoneyama, Osaka (JP); Koshi Watamura, Osaka (JP)

(73) Assignee: CAPCOM CO., LTD., Chuo-ku, Osaka (JP)

( * ) Notice: Subject to any disclaimer, the term of this patent is extended or adjusted under 35 U.S.C. 154(b) by 141 days.

(21) Appl. No.: 15/440,453

(22) Filed: Feb. 23, 2017

(65) Prior Publication Data
US 2017/0243394 A1    Aug. 24, 2017

(30) Foreign Application Priority Data
Feb. 24, 2016    (JP) ................. 2016-032749

(51) Int. Cl.
*G06T 15/50*    (2011.01)
*A63F 13/57*    (2014.01)
(Continued)

(52) U.S. Cl.
CPC ............ *G06T 15/50* (2013.01); *A63F 13/213* (2014.09); *A63F 13/25* (2014.09); *A63F 13/525* (2014.09);
(Continued)

(58) Field of Classification Search
CPC ..... G06T 13/40; G06T 13/60; G06T 2210/24; G06T 15/50; G06T 15/205; A63F 13/57
See application file for complete search history.

(56) References Cited

U.S. PATENT DOCUMENTS

| 5,245,320 A * | 9/1993 | Bouton ............. A63F 13/06 273/148 B |
| 9,147,283 B1 * | 9/2015 | McVey ............. G06T 17/00 |

(Continued)

OTHER PUBLICATIONS

Page entitled "Billboard" as presented on PolycountWiki, Last modified Feb. 14, 2015, and downloaded from http://wiki.polycount.com/wiki/Billboard on Aug. 23, 2018.*

(Continued)

*Primary Examiner* — David L Lewis
*Assistant Examiner* — Robert E Mosser
(74) *Attorney, Agent, or Firm* — IP Business Solutions, LLC (57) ABSTRACT

The present invention causes a computer to function as a virtual space generating unit, a game screen displaying unit, a billboard setting unit, a data acquiring unit and a transmittance setting unit. The billboard setting unit sets a billboard which has a plain object and which rotates around a predetermined center point in the plain object so that the plain object faces the virtual camera in the virtual space. The data acquiring unit acquires drawing data of the object and two-dimensional-thickness map data, the two-dimensional thickness map data showing relationship between a two-dimensional coordinate on the object shown on the billboard and thickness information on each position coordinate of the object. The transmittance setting unit sets transmittance of light from a light source in the virtual space based on the thickness information.

5 Claims, 8 Drawing Sheets

(51) Int. Cl.
A63F 13/213 (2014.01)
A63F 13/25 (2014.01)
G06T 15/20 (2011.01)
A63F 13/525 (2014.01)

(52) U.S. Cl.
CPC ............ *A63F 13/57* (2014.09); *G06T 15/205* (2013.01); *G06T 2215/16* (2013.01)

(56) References Cited

U.S. PATENT DOCUMENTS

| | | | |
|---|---|---|---|
| 2004/0181382 A1* | 9/2004 | Hu ........................ | G06T 13/60 703/9 |
| 2008/0177519 A1* | 7/2008 | Miller .................... | G06T 13/60 703/9 |
| 2009/0267951 A1* | 10/2009 | Chang ................... | G06T 13/60 345/474 |

OTHER PUBLICATIONS

Page Enititled 2.5D as presented on Wikipedia, last modified Jul. 24, 2018, and downloaded from https://en.wikipedia.org/wiki/2.5D on Aug. 23, 2018.*

Naty Hoffman et al., "Rendering Outdoor Light Scattering in Real Time", Game Developers Conference 2002, (ATI Technologies Inc.), [online] Jan. 13, 2016, <http://amd-dev.wpengine.netdna-cdn.com/wordpress/media/2012/10/ATI-LightScattering.pdf>.

Balazs Toth et al., "Real-Time Volumetric Lighting in Participating Media", Eurographics 2009, [online] Jan. 13, 2016, <http://sirkan.iit.bme.hu/~szirmay/lightshaft.pdf>.

* cited by examiner

NON TRANSITORY COMPUTER-READABLE STORAGE MEDIUM AND METHOD OF CONTROLLING A COMPUTER

TECHNICAL FIELD

This invention relates to a non-transitory computer readable storage medium storing a game program and a controlling method of the game.

BACKGROUND OF THE INVENTION

Video games such as action games and role-playing games make characters act in a three-dimensional virtual game space corresponding to operation input by users. Various three-dimensional objects are located in the three-dimensional virtual game space and they are generated by computer graphics. An image which a virtual camera in the virtual space shoots is displayed on a game screen and a user operates a player character while watching the game screen.

In the game which has the three-dimensional virtual game space, a light from a light source located in a predetermined position in the virtual space affects a three-dimensional object located in the three-dimensional space, and then it is possible to show a realistic three-dimensional space. Particularly, when a light-transmitting three-dimensional object is located between the virtual camera and the light source, or when a transmitted light is located, a technique for showing transmission of the light on the light-transmitting object (for example volumetric lighting) is known (for example Non-patent literature 1 and 2).

Non-patent literature 1: Naty Hoffman, Arcot J Preetham, "Rendering Outdoor Light Scattering in Real Time", Game Developers Conference 2002, (ATI Technologies Inc.), [online] Jan. 13, 2016, <http://amd-dev.wpengine.netdna-cdn.com/wordpress/media/2012/10/ATI-LightScattering.pdf>

Non-patent literature 2: Balazs Toth, Tamas Umenhoffer, "Real-Time Volumetric Lighting in Participating Media", Eurographics 2009, [online] Jan. 13, 2016, <http://sirkan.iit.bme.hu/~szirmay/lightshaft.pdf>

SUMMARY OF THE INVENTION

Technical Problem

However, the transmission of the light causes increasing calculation amount and processing loads. Therefore, a place where the transmission of the light is shown or time when the transmission of the light is shown is limited.

The present invention has an object to provide a storage medium and a controlling method of the game that can show the transmission of the light as a display object with low loads, in a game with three-dimensional virtual space.

The present invention causes a computer to function as a virtual space generating unit, a game screen displaying unit, a displaying unit. The displaying unit includes a billboard setting unit, a data acquiring unit, and a transmittance setting unit. The virtual space generating unit generates a three-dimensional virtual space. The game screen displaying unit displays an image as a game screen taken by a virtual camera located in the virtual space. The displaying unit is for displaying pseudo three-dimensional representation of an object through which at least a part of light transmits on the game screen. The billboard setting unit sets a billboard which has a plain object and which rotates around a predetermined center point in the plain object so that the plain object faces the virtual camera in the virtual space. The data acquiring unit acquires drawing data of the object and two-dimensional thickness map data which show relationship between a two-dimensional coordinate on the object described on the billboard and thickness information on each position coordinate of the object. The transmittance setting unit sets transmittance of the light from a light source in the virtual space based on the thickness information.

The transmittance setting unit may change transmittance of the light from the light source based on the angle of incidence of the light from the light source to the plain object of the billboard.

The displaying unit may include a reflectance setting unit for setting reflectance of the light from the light source on the object. And the transmittance setting unit may change transmittance and reflectance of the light from the light source based on the angle of incidence of the light from the light source to the plain object of the billboard.

The object may be a fluid and the present invention may cause the computer to function as a two-dimensional simulation unit for executing a two-dimensional simulation of the fluid and displaying the simulation result on the plain object.

A method of controlling a computer according to the present invention comprises a virtual space generating step for generating a three-dimensional virtual space, a game screen displaying step for displaying an image as a game screen taken by a virtual camera located in the virtual space and a displaying step for displaying pseudo three-dimensional representation of an object through which at least a part of light transmits on the game screen. The displaying step includes a billboard setting step for setting a billboard which has a plain object and which rotates around a predetermined center point in the plain object so that the plain object faces the virtual camera in the virtual space, a data acquiring step for acquiring drawing data of the object and two-dimensional thickness map data, the two-dimensional thickness map showing relationship between a two-dimensional coordinate on the object described on the billboard and thickness information on each position coordinate of the object and a transmittance setting step for setting transmittance of the light from a light source in the virtual space based on the thickness information.

ADVANTAGES OF THE INVENTION

According to the present invention, a storage medium, and a controlling method of the game that can show transmission of light as a display object with low loads in a game with three-dimensional virtual space are provided.

DESCRIPTION OF EMBODIMENT

Hereinafter, a non-transitory computer-readable storage medium and a method for controlling a game according to one embodiment of the present invention will be described with reference to the drawings.
Summary of the Game The following is an example of an action game executed on a home game console device. The action game according to one embodiment generates a three-dimensional virtual game space. A user operates a player character acting in the virtual game space. The player character fights with enemy characters for the predetermined purpose such as killing off the enemy characters or arriving at a predetermined position in the virtual game space.
Hardware Configuration The game device 2 executing the game is described. The game system according to the one embodiment includes the game device 2 and external devices such as a monitor (display unit) 19, a speaker 22, and a controller (manipulation unit) 24 which are connected to the game device 2. The game system can execute the game based on a game program 30A and game data 30B loaded from a disk-typed storage medium 30. Hereinafter, the game system is simply described as the game device 2 in some cases.

Figure 1:
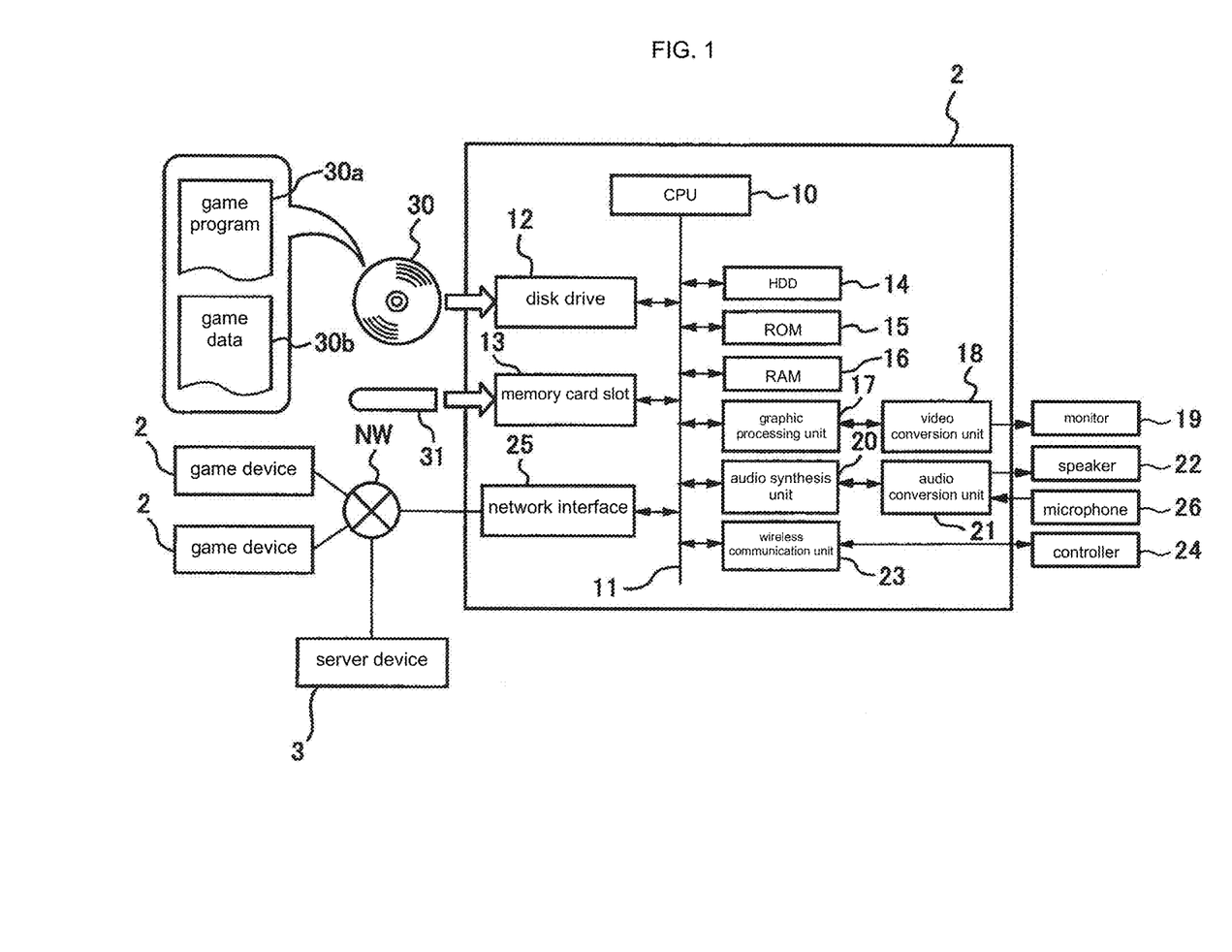
FIG. 1 is a block diagram showing a configuration of hardware in a game device according to one embodiment of the present invention.

FIG. 1 is a block diagram showing a configuration of hardware in the game device 2 according to one embodiment. As shown in FIG. 1, the game device 2 can communicate to other game devices 2 and a server 3 in both ways via a communication network NW such as Internet or a local area network (LAN). The game device 2 has a central processing unit (CPU) 10 for controlling the game device 2. The CPU 10 is connected to a disk drive 12, a memory card slot 13, a hard disk drive (HDD) 14 for storing a program, a read only memory (ROM) 15, and a random access memory (RAM) 16 via a bus 11.

Also, the CPU 10 is connected to a graphic processing unit 17, an audio composition unit 20, a wireless communication unit 23, and a network interface 25 via the bus 11.

The graphic processing unit 17 draws a game image including the virtual game space and characters in response to instructions from the CPU 10. The graphic processing unit 17 is connected to an external monitor 19 via the video conversion unit 18. The game image drawn by the graphic processing unit 17 is converted to a video format, and the video is displayed on the monitor 19.

The audio synthesis unit 20 plays and synthesizes digital game sounds in response to instructions from the CPU 10. The audio synthesis unit 20 is connected to an external speaker 22 via an audio conversion unit 21. Therefore, the game sounds played and synthesized by the audio synthesis unit 20 are decoded to an analog format by the audio conversion unit 21, and are output to outside from the speaker 22.

The audio conversion unit 21 encodes user's voices input from a headset connected to the game device 2 or a microphone 26 embedded in the controller 24 into digital format data. The audio synthesis unit 20 can acquire the digital format data and can send acquired data to the CPU 10 as input data.

Figure 2:
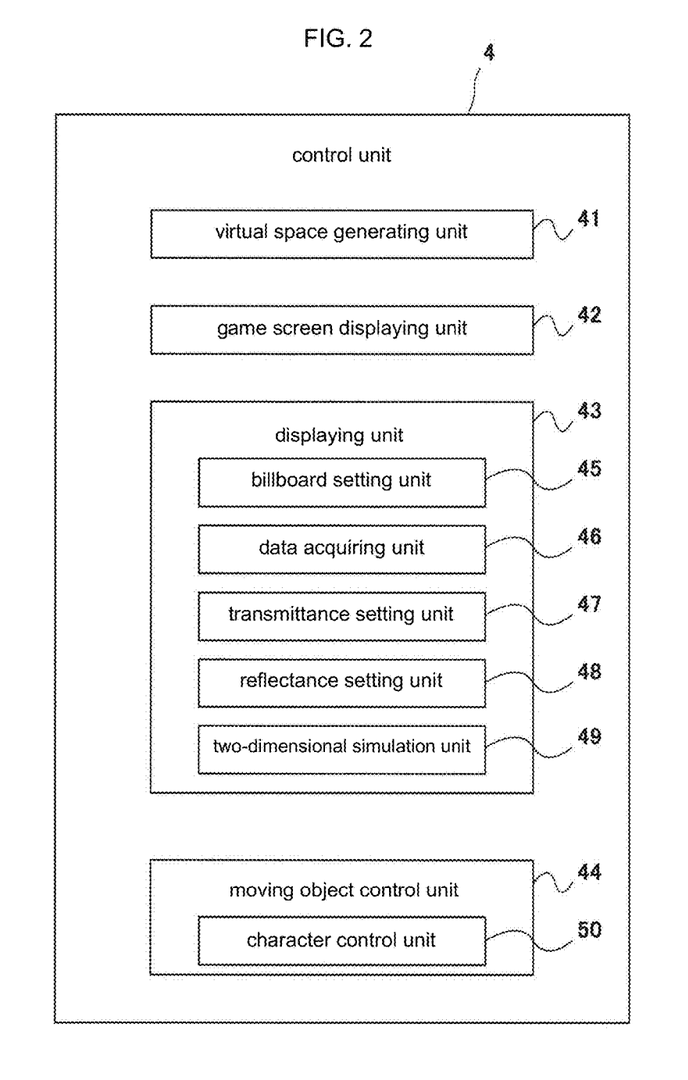
FIG. 2 is a block diagram showing a functional configuration of the game device shown in FIG. 1.

The wireless communication unit 23 has a 2.4 GHz band wireless communication module. The wireless communication unit 23 is connected to the controller 24 wirelessly, and can send and receive data. The user inputs signals into the game device 2 by manipulating control elements such as buttons on the controller 24 and can control an action of the player character displayed in the monitor 19. Also, the network interface 25 connects the game device 2 to communication network NW such as the Internet or LAN. The game device can communicate with other game devices 2 or the server 3. The game device 2 is connected to other game devices 2 via the communication network NW. Each of the game devices 2 sends and receives data. Each of the game devices 2 can display multiple player characters in the same virtual game space in synchronization. Therefore, a multi-play, in which multiple player characters corresponding to multiple users fight with enemy characters together or fight with other player characters, is executable.
Functional Configuration of the Game Device FIG. 2 is a block diagram showing a functional configuration of the game device shown in FIG. 1. The game device 2 operates as a computer including a control unit 4 including the CPU 10, the HDD 14, the ROM 15, the RAM 16, the graphic processing unit 17, the video conversion unit 18, the audio synthesis unit 20, the audio conversion unit 21, the network interface 25, and the like. As shown in FIG. 2, the control unit 4 of the game device 2 operates as a virtual space generating unit 41, a game screen displaying unit 42, a displaying unit 43, and a moving object control unit 44 by executing the game program 30a. The fluid displaying unit 43 includes a two-dimensional data acquiring unit 45 and a simulating unit 46. The displaying unit 43 includes a billboard setting unit 45, a data acquiring unit 46, a transmittance setting unit 47, a reflectance setting unit 48, and a two-dimensional simulation unit 49. The moving object control unit 44 includes a character control unit 50.

The virtual space generating unit 41 generates a third-dimensional virtual space. The virtual space is a game space in which the player character operated by the user acts. The virtual space generating unit 41 generates fixed objects located in the virtual space and/or moving objects such as player characters moving in the virtual space. For example, the virtual space generating unit 41 loads data about objects, textures, and so on included in game data 30B, and arranges them in the three-dimensional virtual space, in response to the moving player character.

Figure 3:
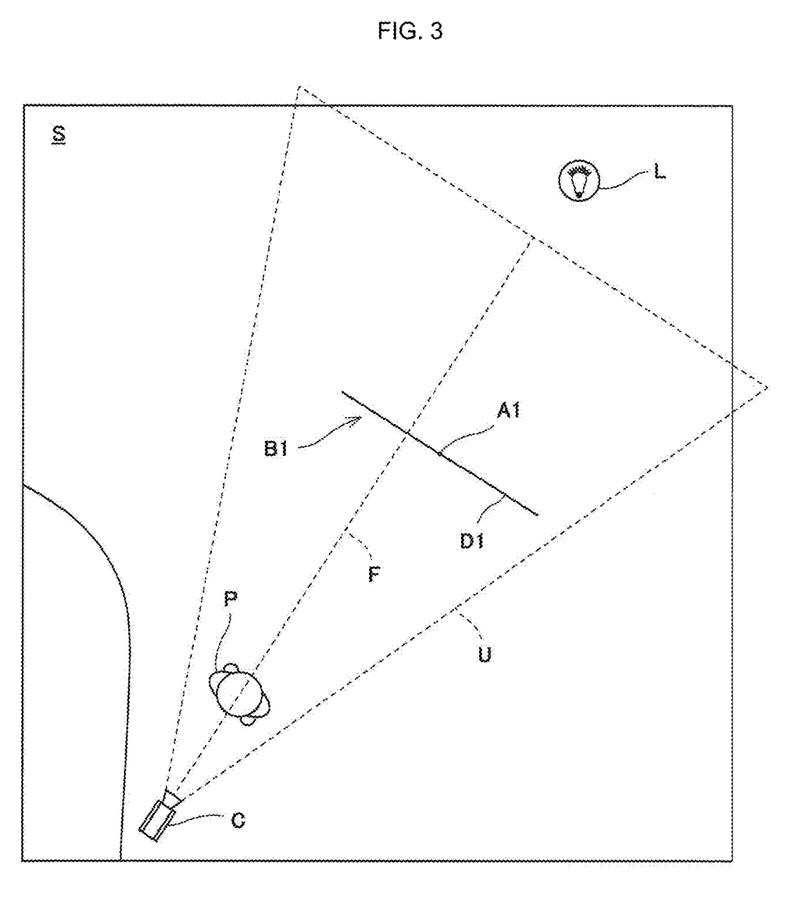
FIG. 3 is a plane view showing a three-dimensional virtual space according to one embodiment of the present invention.
Figure 4:
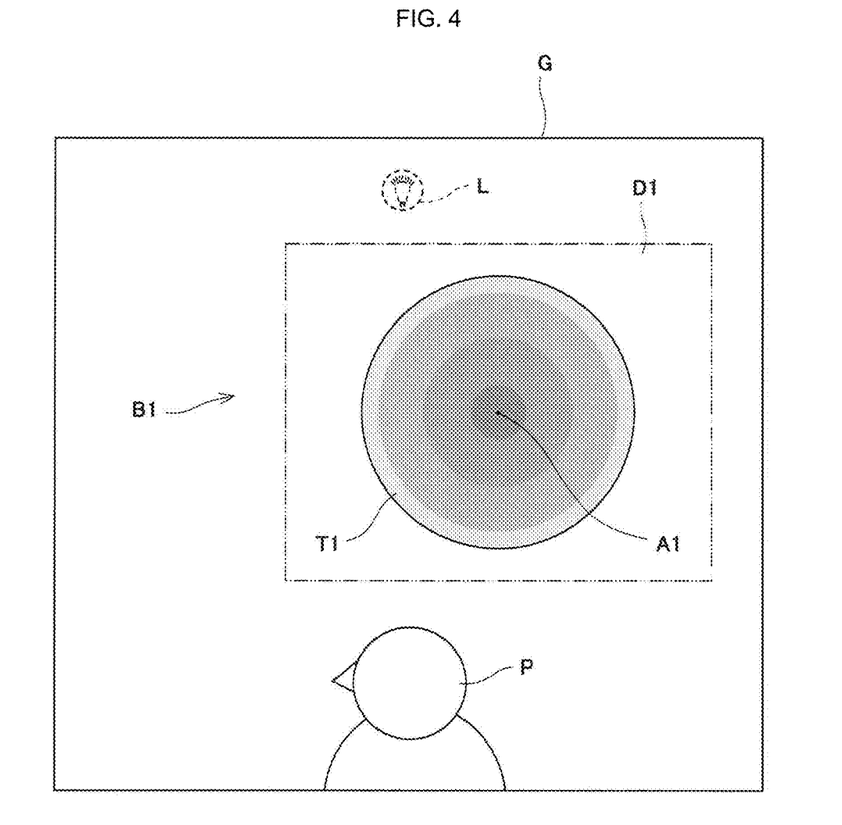
FIG. 4 is a view showing a game screen according to one embodiment of the present invention.

FIG. 3 is a plane view showing a three-dimensional virtual space in the present embodiment. FIG. 4 is a view showing a game screen in the present embodiment. As shown in FIG. 3, in the three-dimensional virtual space S, various objects, a virtual camera C, and a light source L are arranged on a landform drawn with polygons, textures, and so on. In the example of FIG. 3, a player character P operable by the user via the controller 24 is located in the virtual space S as a moving object.

The moving object control unit 44 controls actions of the moving object P. The moving object control unit 44 functions as the character control unit 50, and controls actions of the player character corresponding to the user who operates the computer in response to operation input of the controller 24 by the user or a progress status of the game. The moving object includes a movable character other than the player character P or a movable object. The moving objects include movable objects other than the player character P and the non-player object E. For example, the moving objects include vehicles such as cars and airplanes, flying objects such as balls, bombs, bullets and arrows, animals, and fixed objects such as furniture that is spattered by burst. The moving object control unit 44 also controls these moving objects.

The game screen displaying unit 42 displays images that are taken by the virtual camera C located in the virtual space S as a game screen G (FIG. 4) on the monitor 19. The moving objects P and an object T1 (described later) included in a shooting range U of the virtual camera C are displayed on the game screen G.

The displaying unit 43 displays pseudo three-dimensional representation of the object T1 which is located in the virtual space S and through which at least a part of light passes. In the present embodiment, as shown in FIG. 4, the object T1 is a translucent sphere. The object T1 is not limited to this; an object through which at least a part of light passes may be applicable. Also, the object T1 is not limited to an object having a fixed form and a character. For example, gas including particles such as smoke or a fluid not having a fixed form such as water and blood may be applicable.

The billboard setting unit 45 locate a billboard B1 in a position where the object T is shown in the virtual space S. The billboard B1 is located in a predetermined position in the virtual space S. Alternatively, the billboard setting unit 45 may locate the billboard B1 so that the billboard B1 can be attached to the moving object.

The billboard B1 has a plain object D1 and a center point A1 located in the plain object D1 and rotates about the center point A1 so that the plain object D faces the virtual camera C. Therefore, the surface of the plain object D1 is orthogonal to a line segment F1 that is obtained by connecting the virtual camera C and the center point A1, even if the virtual camera C changes its position. The plain object D is not displayed on the game screen G (this is transparent); however, it is specified for comprehension in FIG. 3 and FIG. 4.

The rotation range of the billboard B1 about the center point A1 may be limited to a predetermined range. For example, the billboard B1 can rotate only about a vertical axis and cannot rotate about a horizontal axis. In this case, the angle of the height direction (angle of elevation) of the virtual camera C is preferably fixed.

The object T1 is shown on the plain object D1 of the billboard B1 and the plain object D1 faces the virtual camera C when the virtual camera C has changed its position. Consequently, the object T1 is displayed at all times on the game screen G while the billboard B1 is located in the range U of the virtual camera C.

The game data 30B include data for drawing the object T, two-dimensional coordinates of the object T1 on the billboard B1, and a two-dimensional thickness map data showing thickness information of object T1 on the two-dimensional coordinates.

Figure 5:
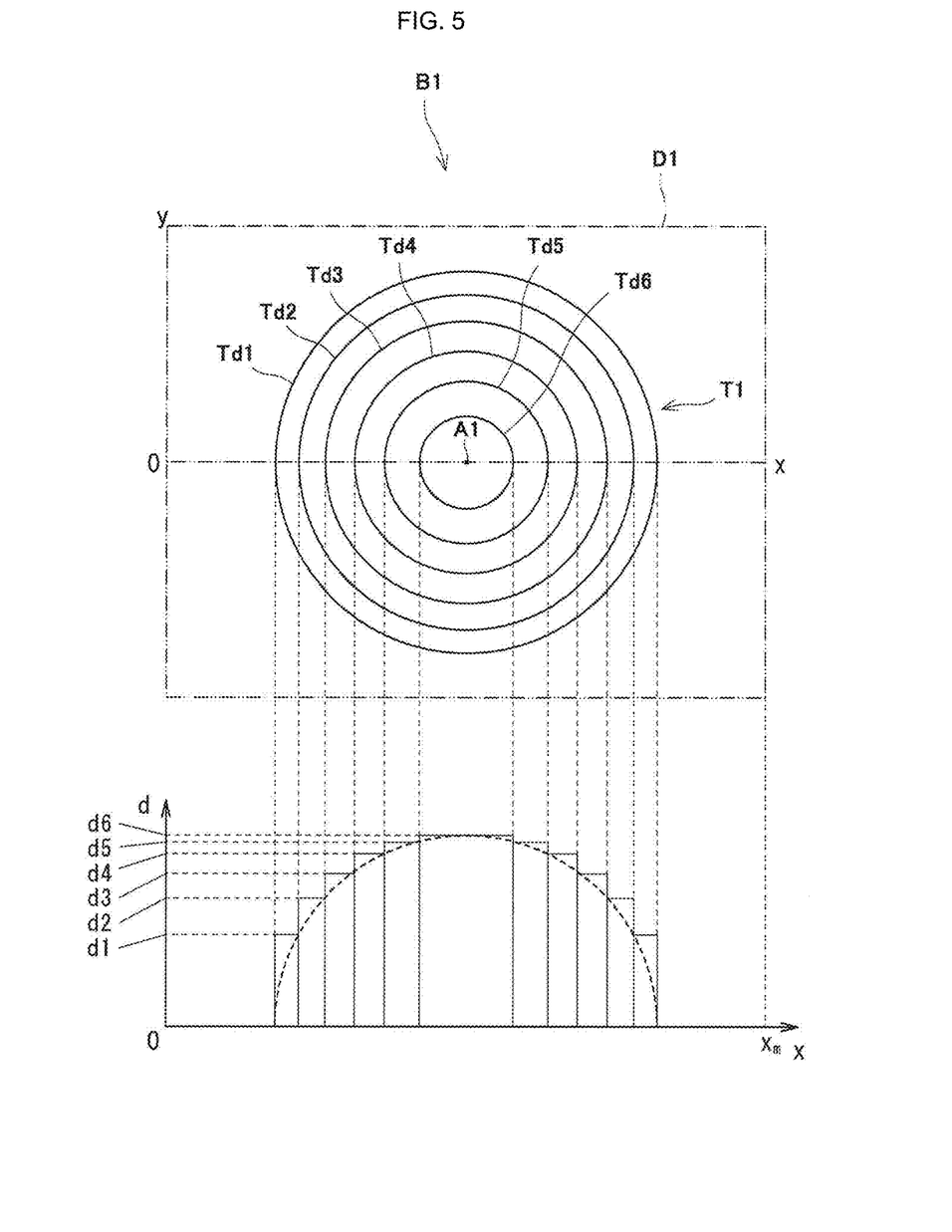
FIG. 5 is a view showing a two-dimensional thickness map of an object according to one embodiment of the present invention.

FIG. 5 is a view showing the two-dimensional thickness map of an object. As shown in FIG. 5, the two-dimensional coordinates are set on the plain object D1 of the billboard B1. The horizontal axis is x and the vertical axis is y on the plain object D1 in FIG. 5. The x axis is a bisector of the plain object D1 and the y axis is a left-hand side of the plain object D1. 0 on the x axis is the left end of the plain object D1 and xm, which is positive value, is the right end of the plain object D1. The center of the object T1 equals the center point of the plain object D1. Also, the center point A1 of the billboard B1 equals the center point of the plain object D1. However, the present invention is not limited to this; the center point A1 of the billboard B1 may be any point on the plain object D1. The center of the object T1 may be any point on the plain object D1. Described above, the object T1 may not have a fixed form.

The two-dimensional coordinates of the plain object D1 has thickness information of the object T1. In the embodiment, step-like values (discrete values) are set as the thickness. On the billboard B1 in FIG. 5, border lines Td1-Td6 are shown on the object T1 to show a region which has the same thickness. A downside graph shown in FIG. 5 shows thickness d of the object T1 set on the x axis. When viewed from the vertical direction of the plain object D1 (a direction of a line segment F1 which is obtained by connecting the virtual camera C and the center point A1), outside of the object T1 is thin and inside of the object T1 is thick. As a result, the border lines Td1-Td6 which show a region which has same thickness information are concentric. The downside graph in FIG. 5 indicates that the thickness d of the plain object D1 on the x axis is increased from the thickness of the outside part d1 to the thickness of the center part d6.

Information of the thickness d is set on all areas of the plain object D1 based on drawing data of the object T1 shown on the plain object D1. The information of the thickness d is stored as the two-dimensional thickness map in the game data 30b.

In the above example, the two-dimensional thickness map is visible by the graph; however, the two-dimensional thickness map is not limited to this while the two-dimensional thickness map can be read out thickness information in response to the two-dimensional coordinates. In the embodiment, the step-like values (discrete values) are set as the thickness; however, continuous values may be set by using mathematical formula.

The data acquiring unit 46 acquires drawing data of the object T1 and two-dimensional thickness map of the plain object D1 on which the object T1 is shown, from game data 30b.

The transmittance setting unit 47 sets a transmittance of the object T1 based on thickness information of the object T1 when the light from the light source L transmits through the object T1. The transmittance of the object T1 is set based on the two-dimensional thickness map showing thickness information of the object T1 on the two-dimensional coordinates on the billboard B1. The thicker the thickness d is at a point on the object T1 (the nearer d6) is, the lower the value is set as the transmittance. The thinner the thickness d is at a point (the nearer d1), the higher the value is set as the transmittance. In the case of the spherical object T1, at the nearer point to the center of the object T1, the darker the transmitted light is. The nearer point to the outside of the object T1, the brighter the transmitted light is.

The billboard B1 rotates so that the plain object D can face the virtual camera C when the virtual camera changes its position. As a result, the object T1 displayed on the plain object D1 of the billboard B1 may be pseudo-three-dimensionally described. The transmittance is set based on the thickness information of the object T1 on the two-dimensional coordinates on the billboard B1. Accordingly, it is possible to display the object T1 through which the light transmits with low loads by using the billboard B1 and to show three-dimensional transmission of the light on the object T1 by using the two-dimensional thickness map on the billboard B1.

Figure 6:
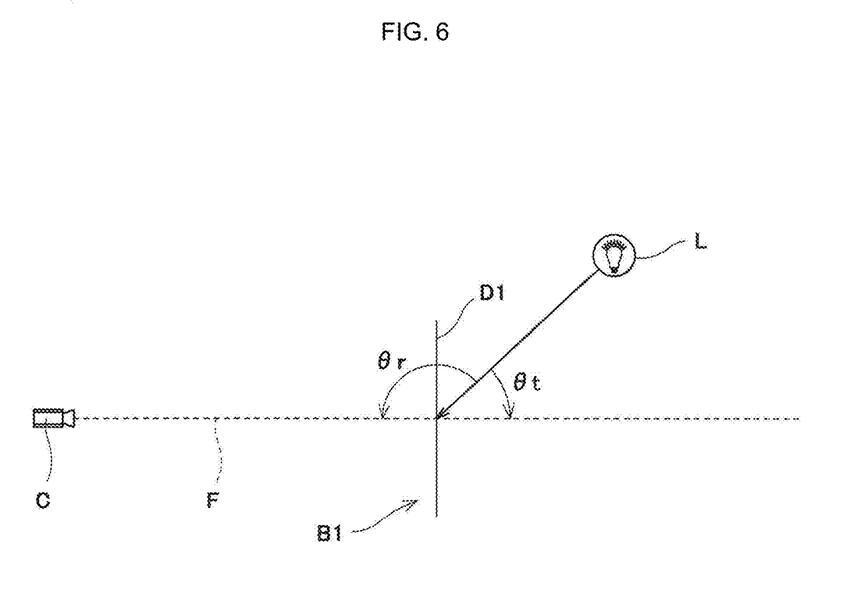
FIG. 6 is a view showing a positional relationship between a billboard and a light source according to one embodiment of the present invention.

The transmittance setting unit 47 may be changing the transmittance of the object T1 based on an angle between the direction of the billboard B1 (a direction of a line segment F1 which is obtained by connecting the virtual camera C and the center point A1) and the light incident direction from the light source L to the plain object D1 of the billboard B1 (that is an angle of incidence). FIG. 6 is a view showing a positional relationship between the billboard and the light source in the embodiment.

As shown in FIG. 6, an angle of incidence of a light J (incident light) from the light source L to the plain object D1 is defined as θt. When the light source L is located in the position on the line F1 which is obtained by connecting the virtual camera C and the center point A1 and the opposite side of the virtual camera C (the light source L is backlight), θt is 0 degree. For example, the transmittance of the object T1 is 100% when θt is 0 degree. The transmittance setting unit 47 changes the transmittance of the object T1 so that the larger et is, the lower the transmittance is, and the transmittance is 0% when θt is 180 degree. A relationship between et and transmittance is not limited to this. For example, the transmittance setting unit 47 may change the transmittance so that the transmittance become 0% when θt is 90 degree. The object T is naturally shown by changing the transmittance of the object T1 based on the angle of incidence of the light (θt).

The reflectance setting unit 48 may consider a reflection of light on the plain object D1. The reflectance setting unit 48 sets reflectance of a position on the object T1. The reflectance setting unit may set reflectance of the object T1 based on the thickness information of the object T1. Alternatively the reflectance setting unit 48 may display the object T1 considering a reflection of light on the plain object D1 without the thickness information of the object T1.

When the reflectance setting unit 48 considers a reflection of the light on the plain object D1, the displaying unit 43 changes transmittance and reflectance based on the angle of incidence of the light (θt). Described above, the larger θt is, the lower transmittance is set and the smaller θt is, the higher transmittance is set by the transmittance setting unit 47. The smaller θt is (θr=180 degrees-θt, the larger θr is), the lower the reflectance is set and the larger θt is (the smaller θr is), the higher the reflectance is set by the reflectance setting unit 48. A total value of the transmittance and the reflectance is defined as 100; the transmittance and the reflectance may be set based on θt in the range of the total value (total value is 100 at all times). For example, when θt is 0 degrees, a ratio of transmittance to reflectance is 100:0. When θt is 180 degrees, the ratio of transmittance to reflectance is 0:100. When θt is 90 degrees, the ratio of transmittance to reflectance is 50:50. When θt is 45 degrees, the ratio of transmittance to reflectance is 75:25.

The object is naturally shown by changing lighting based on whether the light is a follow light or a backlight and switching two lightings seamlessly.

Figure 7:
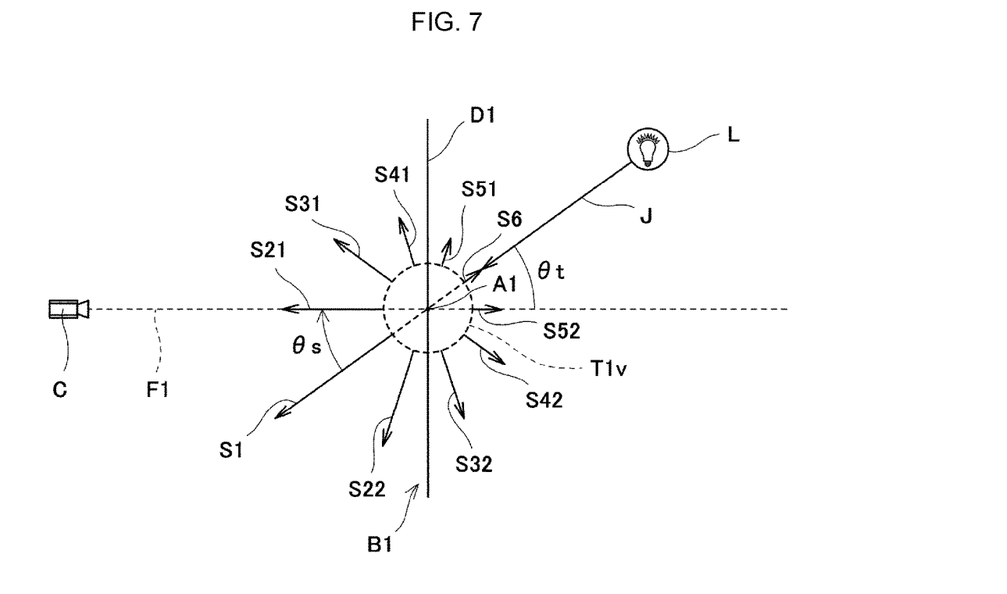
FIG. 7 is a view showing transmittance based on a light scattering in the case of the positional relationship shown in FIG. 6

Additionally, the transmittance setting unit 47 may set the transmittance based on a light scattering in the position on the object T1, regardless of whether or not the reflection is considered. FIG. 7 is a view showing transmittance based on the light scattering in the case of the positional relationship shown in FIG. 6

In the embodiment, the object T1 of which a center is the center point A1 of the billboard B1 is regarded as particle which cause light scattering and the light J (incident light) from the light source L is scattered in the object T1. In FIG. 7, the billboard B1 rotates about the center point A1, so that the object T1 shown pseudo-three-dimensionally is shown as a spherical form T1ν. The incident light J from the light source L scatters in the object T1 (form T1ν) and a scattered light is emitted around the object T1.

In FIG. 7, an example of a scattered light by Mie scattering is shown. In Mie scattering, when a direction of scattered light is the same as a direction of the incident light J, a light intensity becomes large. In FIG. 7, the scattered light includes a scattered light S1 which has only component of a direction which is the same as the direction of the incident light J (no vertical component of a direction which is the same as the direction of the incident light J) and a scattered light S6 which has only component of a direction which is an opposite direction from the direction of the incident light J. Ten scattered lights S1, S21, S22, S31, S32, S41, S42, S51, S52, and S6 dividing equally the form T1ν are indicated by arrowed lines. In this case, intensity of the scattered lights is indicated below.
S6<S51=S52<S41=S42<S31=S32<S21=S22<S1<J The transmittance setting unit 47 determines the transmittance of the object T1 based on the intensity of the scattered light (S21) which moves on to the virtual camera C on the line F1. In other words, the transmittance setting unit 47 determines transmittance of the object T1 based on an intensity of the scattered light with a scattering angle θs which is equal to the angle of incidence of the light θt. For example, a transmittance ratio of a scattered light S1 (basis-scattered light) with a scattering angle θs=0 is set as 1. The larger θs is, the smaller the transmittance ratio (1 or less) is set. When the transmittance ratio of a scattered light S21 is set as 0.7, the transmittance setting unit 47 determines the transmittance based on the thickness information of the object T1 and multiplies the transmittance by 0.7. Then the transmittance setting unit 47 sets the transmittance on the billboard B1. The basis-scattered light may be a scattered light with a scattering angle θs (for example scattered light S6). In this case, a ratio of the scattered light may be 1 or more. Alternatively, every scattering angle θs may have correction value of the transmittance instead of the basis-scattered light.

In the embodiment, the transmittance of the object T1 shown on the billboard B1 is set based on the actual scattering phenomenon. The transmittance based on the thickness information of the object T1 is corrected based on the scattering phenomenon, so that realistic shade can be shown.

(Other Examples)

In the above example, the object T1 is a spherical transmissive object and is displayed as a still image on the plain object D1 of the billboard B1. Alternatively, the object T1 may be a moving object on the plain object D1 of the billboard B1. The displaying unit 43 may display an animation or a two-dimensional simulation of the fluid on the plain object of the billboard. Also, multiple billboards may be used for showing the object T1.

Figure 8:
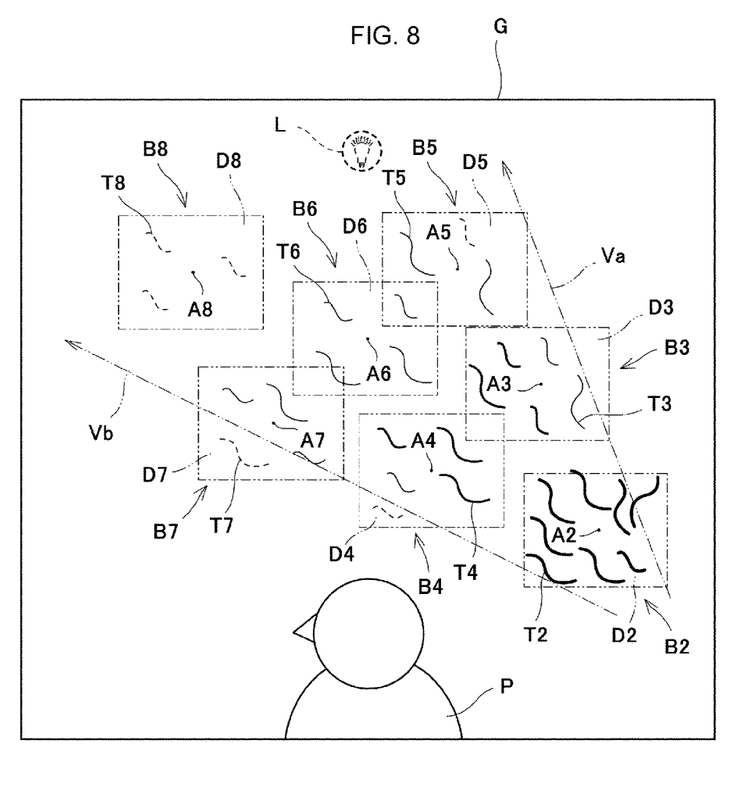
FIG. 8 is a view showing a game screen in which an object on the billboard is displayed according to another embodiment of the present invention.

FIG. 8 is a view showing a game screen in which an object on the billboard is displayed in another embodiment. There are seven billboards B2-B8 between the virtual camera C (player character P) and the light source L in the example. The objects T2-T8 are shown on the plain objects D2-D8 of the billboards B2-B8 and they are displayed on the game screen G. The objects T2-T8 are shown as the fluids (gas including particle like smoke) which flow from lower right to upper left (between Va and Vb) on the game screen G. The center points A2-A8 of the billboards B2-B8 are fixedly set in the virtual space S. The objects T2-T8 are shown as if they move in the plain object D2-D8.

As the fluids shown by the objects T2-T8 go from lower right to upper left on the game screen G, the fluids become thin. In FIG. 8, the thicker the objects T2-T8 are, the thicker the fluids are. The objects T2-T8 shown by dashed lines rather than solid lines are thin. A two-dimensional-thickness map on the plain objects D2-D8 of the objects T2-T8 is set so that the objects T3 and T4 will be thinner than the object T2, and the object T5-T7 will be thinner than the object T3 and T4, and the object T8 will be thinner than the objects T5-T7.

The thickness of the objects T2-T8 may differ from each other based on the position of the plain object D2-D8. For example, the two-dimensional thickness map of the billboards B3, B4, B5, and B7 is set so that the nearer the objects T3, T4, T5 and T7 are in the center of Va-Vb, the thicker they are, and nearer the objects T3, T4, T5 and T7 are in the edge of Va-Vb (near Va or Vb), the thinner they are. Also, the two-dimensional thickness map is set so that the thickness will become thin as the fluids go from lower right to upper left in the plain objects.

The thickness information in the two-dimensional-thickness map for the objects T2-T8 is rewritten according to the movement of the objects T2-T8. Thus, the transmittance of the light from the light source L can be set according to the movement of the objects T2-T8 even if the objects T2-T8 move in the plain objects D2-D8.

The two-dimensional simulation unit 49 executes a two-dimensional simulation of the objects T2-T8 on the plain objects D2-D8 of the billboards B2-B8 and displays the simulation result on the plain objects D2-D8. In the two-dimensional simulation, predetermined grids (simulation grids) are set on the plain objects D2-D8 of the billboards B2-B8. For example, the simulation grid divides each of the plain objects D2-D8 into 64×64 parts. The two-dimensional simulation unit 49 simulates the fluids (the objects T2-T8) of which starting point is a predetermined fluid source on the plain objects D2-D8 by the grid.

The way of the two-dimensional simulation is not limited and a known simulation way may be used. For example, the way described the following literature is used as the two-dimensional simulation.

"Real-Time Fluid Dynamics for Games", Jos Stam, <http://www.intpowertechcorp.com/GDC03.pdf>, "Fast Fluid Dynamics Simulation on the GPU", Mark J. Harris, Chapter 38. GPU Gems, <http://http.developer.nvidia.com/GPUGems/gpugems_ch38.html>

"A Simple Fluid Solver based on the FFT", Jos Stam, <http://www.dgp.toronto.edu/people/stam/reality/Research/pdf/jgt01.pdf>

"Go With The Flow: Fluid and Particle Physics in PixelJunk Shooter", Jaymin Kessler, Game Developers Conference 2010, <http://fumufumu.q-games.com/gdc2010/shooterGDC.pdf>

It is possible to prevent increasing the processing loads for showing the flow of the fluid by combining the billboards B2-B8 which show the two-dimensional fluids (the objects T2-T8) three-dimensionally with the two-dimensional simulation. In other words, it is possible to prevent decreasing the process speed for displaying the three-dimensional virtual space including the fluid.

In the case of showing the objects T2-T8 by the two-dimensional simulation or animation, concentration values prepared for the two-dimensional simulation may be used as the thickness information of the two-dimensional-thickness map. Consequently, it is possible to show transmission of light by using existing drawing software.

The two-dimensional simulation is executed based on a predetermined simulation condition. For example, the simulation condition is set as one or a plurality of parameters based on properties of the fluid (a kind of gas, a kind of liquid, viscosity of fluid and the like), moving direction of the fluid on a starting point, initial velocity, the direction of gravity, and the like. The two-dimensional simulation unit 49 executes the two-dimensional simulation based on a positional relation between the plain objects D2-D8 of the billboards B2-B8 and a predetermined element which interfere a predetermined fluid in the virtual space S. The predetermined element may be a character in which the billboards B2-B8 are located, the movement of the billboards B2-B8 in response to the movement of the object and environmental element such as wind and rain.

A three-dimensional interference with the fluid by an external element is processed as flat interference on the billboards B2-B8. The two-dimensional simulation with the flat interference by the external element projected on the billboards B2-B8 is executed. Thereby, it is possible to reduce loads of simulation as compared with the three-dimensional simulation with the three-dimensional interference.

When the three-dimensional simulation is executed in the cube which has a 64×64×64 grid, to process the interference by the external element, it is necessary to process not only flat interference but also the interference from the depth direction. On the other hand, in the case of the two-dimensional simulation in the plain object D (64×64), it is not necessary to process the interference from the depth direction. The number of parts of grid does not just decreases (1/64), but it is not necessary to calculate a three-dimensional vector operation. Therefore, the two-dimensional simulation on the billboards B1 and B2 have very small loads as compared with the three-dimensional simulation.

In the embodiment, the fluid source on the billboard B2 is located lower right on the plain object D2 of the billboard B2. The fluid sources on the billboards B3-B8 are located on a near position where the object on the upstream billboard arrives at edge of the plain object. For example, the fluid source on the billboard B3 above the billboard B2 is located on the lower end of the plain object D3. The fluid source on the billboard B4 on the left side of the billboard B2 is located on the right end of the plain object D4. It is possible to show a continuous flow of the fluid by the billboards B2-B8.

The fluid source may be a predetermined position on the plain objects D2-D8 of the billboards B2-B8. When the billboards B2-B8 are set on a moving object or a fixed object, the fluid source is set on the moving object or the fixed object (internal of the object or external of the object). When the fluid source overlaps the billboards B2-B8, the fluid occurs in the overlap position on the billboards B2-B8.

The fluid shown by using the objects T2-T8 may be gas including particle such as fog, mist, vapor and flame, or liquid such as water, and blood. In the above example, the center points A2-A8 of the billboards B2-B8 are fixed in the virtual space S. Alternatively, one or more billboards may move independently of the object located in the virtual space S, based on the move of the center points (for example move to Va or Vb).

(Another Example)

The present invention may be improved, changed, and modified without departing from the broader idea and scope of the invention and not intended to be limited to the particular embodiments (forms) disclosed above.

In the above example, one light source L is located in the virtual space S. Alternatively multiple light sources may be located in the virtual space S. In this case, the transmittance setting unit 47 and the reflectance setting unit 48 calculate transmittance and reflectance based on the positions of the light sources. The transmittance and the reflectance may change based on a distance between the billboard and the light source.

The billboards are not limited to be separately located in the virtual space S. For example, the multiple billboards may be connected. This is generally called a ribbon; the edge of the billboard is connected to another billboard (other billboards). This is effective for showing long smoke (beacon).

The two-dimensional simulation unit 49 may switch to display and to hide the fluid on the billboards (or, to execute and to stop the two-dimensional simulation) depending on the distance from the virtual camera C. In this case, the two-dimensional simulation unit 49 hides the fluid on the billboard or stops the two-dimensional simulation if the distance between the virtual camera C and the billboard is longer than a predetermined distance. If the fluid on the billboard is not seen very well on the game screen, the two-dimensional simulation unit 49 hides the fluid. Thereby it is possible to reduce loads. Preferably, switching to display and to hide the fluid on the billboards (or, to execute and to stop the two-dimensional simulation) is performed in a step-by-step manner.

Also, when the billboard is set to the object, the two-dimensional simulation unit 49 may switch to display and to hide the fluid on the billboards (or, to execute and to stop the two-dimensional simulation) depending on the direction of the object against the virtual camera C. When the billboard is set to the moving object and the moving object has been hidden by a shielding object (fixed object), the two-dimensional simulation unit 49 may change the two-dimensional simulation (for example slow simulation speed).

In the above embodiment, the virtual camera C is located behind the player character P and moves with the movement of the character P. However, the virtual camera C may move independently of the player character P, or the virtual camera C may be located fixedly in a predetermined position. When the virtual camera C may be located fixedly, especially, when the multiple virtual cameras C shoot the same object from different direction from each other, the fluid may be preferably described on the object by the above process.

When the multiple billboards are used for the fluid, the two-dimensional simulation unit 46 may limit the number of the billboards displaying the fluid (the number of the billboards executing two-dimensional simulation) to a predetermined number (upper limit). Thereby, the fluid can be shown enough with prevention of increasing the processing loads.

According to the above embodiment, an example of an action game is described; however, the present invention is applicable to various games using three-dimensional virtual space such as a role playing game, a simulation game, and a shooting game.

The above embodiment is disclosed in the form of such stationary game consoles. However, the present invention can be applied to mobile game consoles, mobile phones, personal computers, etc.

INDUSTRIAL APPLICABILITY

The present invention is applicable to a game program and a controlling method of the game, in which the game has the three-dimensional virtual space, and is prevented from increasing processing load for showing richly the flow of the fluid on the surface of the three-dimensional objects.

REFERENCE SIGNS LIST

2 game device
30A game program
30B game data
41 virtual space generating unit
42 game screen displaying unit
43 displaying unit
44 moving object control unit
45 billboard setting unit
46 data acquiring unit
47 transmittance setting unit
48 reflectance setting unit
49 two-dimensional simulation unit
50 character control unit
A1-A8 center points
B1-B8 billboards
C virtual camera
D1-D8 plain objects
L light source
S virtual space
T1-T8 objects

The invention claimed is:

1. A non-transitory computer-readable storage medium storing a program for driving a computer to function as:
   a virtual space generating unit for generating a three-dimensional virtual space;
   a game screen displaying unit for displaying an image as a game screen taken by a virtual camera located in the virtual space; and
   a displaying unit for displaying pseudo three-dimensional representation of an object through which at least a part of light transmits on the game screen;
   wherein the displaying unit includes:
      a billboard setting unit for setting a billboard which has a plain shape and which rotates around a predetermined center point in the billboard so that the plain object faces the virtual camera in the virtual space;
      a data acquiring unit for acquiring drawing data of the object on the billboard and two-dimensional-thickness map data, the two-dimensional thickness map data showing relationship between a two-dimensional coordinate on the object shown on the billboard and thickness information on each position coordinate of the object; and
      a transmittance setting unit for setting transmittance of light from a light source in the virtual space based on the thickness information.

2. The non-transitory computer-readable storage medium according to claim 1,
   wherein the transmittance setting unit changes transmittance of the light from the light source based on the angle of incidence of the light from the light source to the billboard.

3. The non-transitory computer-readable storage medium according to claim 1,
   wherein the displaying unit includes a reflectance setting unit for setting reflectance of light from the light source on the object;
   wherein the displaying unit changes transmittance and reflectance of the light from the light source based on the angle of incidence of the light from the light source the billboard.

4. The non-transitory computer-readable storage medium according to claim 1 storing the program for driving the computer to function as:
   a two-dimensional simulation unit for executing a two-dimensional simulation of a fluid and displaying the simulation result on the billboard;
   wherein the object is a fluid.

5. A method of controlling a computer comprising:
- a virtual space generating step for generating a three-dimensional virtual space;
- a game screen displaying step for displaying an image as a game screen taken by a virtual camera located in the virtual space; and
- a displaying step for displaying pseudo three-dimensional representation of an object through which at least a part of light transmits on the game screen;

wherein the displaying step includes:
- a billboard setting step for setting a billboard which has a plain shape and which rotates around a predetermined center point in the billboard so that the billboard faces the virtual camera in the virtual space;
- a data acquiring step for acquiring drawing data of the object and two-dimensional thickness map data, the two-dimensional thickness map showing relationship between a two-dimensional coordinate on the object shown on the billboard and thickness information on each position coordinate of the object; and
- a transmittance setting step for setting transmittance of light from a light source in the virtual space based on the thickness information.

* * * * *